United States Patent
Nagano

(10) Patent No.: US 10,298,803 B2
(45) Date of Patent: May 21, 2019

(54) SCANNING LENS, SCANNING DEVICE, AND IMAGE FORMING APPARATUS INCLUDING SAME

(71) Applicant: Takuya Nagano, Kanagawa (JP)

(72) Inventor: Takuya Nagano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 15/194,974

(22) Filed: Jun. 28, 2016

(65) Prior Publication Data
US 2017/0026537 A1   Jan. 26, 2017

(30) Foreign Application Priority Data

Jul. 22, 2015 (JP) ................................ 2015-145077

(51) Int. Cl.
*H04N 1/193* (2006.01)
*H04N 1/40* (2006.01)
(Continued)

(52) U.S. Cl.
CPC ............. *H04N 1/193* (2013.01); *H04N 1/121* (2013.01); *H04N 1/401* (2013.01);
(Continued)

(58) Field of Classification Search
CPC .......... G02B 7/00; G02B 7/003; G02B 7/008; G02B 7/021; G02B 7/025
(Continued)

(56) References Cited

U.S. PATENT DOCUMENTS 6,472,247 B1 * 10/2002 Andoh .............. H01L 27/14618
257/E21.511
6,574,054 B2 * 6/2003 Hirai ...................... G02B 7/021
359/819

(Continued)

FOREIGN PATENT DOCUMENTS

CN       1378381 A    11/2002
CN     102565802 A     7/2012
(Continued)

OTHER PUBLICATIONS

U.S. Appl. No. 14/979,676, filed Dec. 28, 2015.
(Continued)

*Primary Examiner* — Robert E. Tallman
(74) *Attorney, Agent, or Firm* — Oblon, McClelland, Maier & Neustadt, L.L.P.

(57) ABSTRACT

An scanning lens to scan a document image includes a lens and a retainer to retain the lens bonded and fixed to the retainer by an adhesive. Conditional formula (1), or both conditional formula (2) and conditional formula (3) below are satisfied:

$$Vb = 0, \quad (1)$$

$$0 \leq \left| \alpha_{large} / \alpha_{small} \times \left( \sum_{i}^{n} Vp_i - \sum_{i}^{n} Vm_i \right) \Big/ \left( \sum_{i}^{n} Vp_i + \sum_{i}^{n} Vm_i \right) \right| < 3.5 \ (i = 1, 2, \ldots n), \quad (2)$$

and $$0 < Vb/Va < 0.5. \quad (3)$$

10 Claims, 6 Drawing Sheets

(51) Int. Cl.
*H04N 1/12* (2006.01)
*H04N 1/56* (2006.01)
*H04N 1/401* (2006.01)

(52) U.S. Cl.
CPC .......... *H04N 1/40056* (2013.01); *H04N 1/56* (2013.01); *H04N 2201/0081* (2013.01)

(58) Field of Classification Search
USPC ......... 359/708, 713, 793, 795, 196.1, 205.1, 359/204.3, 210.1, 811, 813, 817, 820, 359/821, 822, 823, 827, 803
See application file for complete search history.

(56) References Cited

U.S. PATENT DOCUMENTS

| | | | |
|---|---|---|---|
| 8,520,137 B2 * | 8/2013 | Lee | G02B 13/0035 257/432 |
| 2002/0101665 A1 | 8/2002 | Ohashi et al. | |
| 2002/0140836 A1 | 10/2002 | Miyake et al. | |
| 2014/0055558 A1 * | 2/2014 | Souma | H04N 5/23238 348/36 |
| 2014/0253983 A1 | 9/2014 | Nagano | |
| 2014/0347710 A1 | 11/2014 | Nagano | |
| 2015/0212319 A1 | 7/2015 | Nagano | |

FOREIGN PATENT DOCUMENTS

| | | |
|---|---|---|
| JP | 3-89311 | 4/1991 |
| JP | 11-142758 | 5/1999 |
| JP | 2000-227566 | 8/2000 |
| JP | 2002-082282 | 3/2002 |
| JP | 2004-279610 | 10/2004 |
| JP | 2015-94851 | 5/2015 |

OTHER PUBLICATIONS

Combined Chinese Office Action and Search Report dated Jul. 4, 2018 in Patent Application No. 201610571063.1, 7 pages (With English Translation of Category of Cited Documents).

Japanese Office Action dated Jan. 22, 2019 in Japanese Application No. 2015-145077, citing documents AO-AS, therein), 3 pages.

* cited by examiner

SCANNING LENS, SCANNING DEVICE, AND IMAGE FORMING APPARATUS INCLUDING SAME

CROSS-REFERENCE TO RELATED APPLICATION

This patent application is based on and claims priority pursuant to 35 U.S.C. § 119(a) to Japanese Patent Application No. 2015-145077, filed on Jul. 22, 2015, in the Japan Patent Office, the entire disclosure of which is hereby incorporated by reference herein.

BACKGROUND

Technical Field

Exemplary aspects of the present disclosure generally relate to a scanning lens, a scanning device, such as a scanner, and an image forming apparatus, such as a copier, a facsimile machine, a printer, or a multi-functional system including a combination thereof.

Related Art

In a scanning device for use in an image scanner, a facsimile machine, or a digital copier to scan a document image, a scanning lens forms a reduced optical image of the original image, and a solid-state image sensor, such as a charge-coupled device (CCD), images the reduced optical image and converts image data into an electronic image data.

To scan original data as color images, a so-called three-line CCD sensor including three light receiving elements with the respective filters for colors, such as red, green, and blue, is employed as the solid image sensor. The three-line CCD sensor forms a reduced optical image of the original onto the light receiving surface of the CCD sensor to perform color separation into three colors, thereby converting the color image data into electrical signals.

In the above-described scanning lens, there is a need for the image surface to have a high contrast in a high spatial frequency region and an aperture efficiency of approximately 100% up to the peripheral portion of the angle of view. In addition, to properly scan a color original document, there is a need for the image forming positions of the respective colors of red, green, and blue on the light receiving surface to coincide, with chromatic aberrations of the respective colors properly corrected.

Such a widely used scanning lens, known as a Gauss lens, provides a relatively large diameter and high resolution. However, to achieve the high performance required in recent years in the configuration of the Gauss lens, the number of lenses increases and the optical system also unavoidably increases in size as a result.

SUMMARY

In an aspect of this disclosure, there is provided an improved scanning lens to scan a document image, including a lens and a retainer to retain the lens bonded and fixed to the retainer by an adhesive, wherein conditional formula (1), or both conditional formula (2) and conditional formula (3) below are satisfied:

$$Vb = 0, \quad (1)$$

$$0 \le \left| \alpha_{large} / \alpha_{small} \times \left( \sum_{i}^{n} Vp_i - \sum_{i}^{n} Vm_i \right) \Big/ \left( \sum_{i}^{n} Vp_i + \sum_{i}^{n} Vm_i \right) \right| < 3.5 \ (i = 1, 2, \ldots n), \quad (2)$$

and $$0 < Vb/Va < 0.5 \quad (3)$$

where, $$\sum_{i}^{n} Vp_i$$

is a total volume of an adhesive protruding in a positive direction of a main scanning direction beyond a bonding portion between the retainer and the lens at at least one bonding location, in which the lens is bonded to the retainer by the adhesive, the main scanning direction including the positive direction and a negative direction opposite to the positive direction, $$\sum_{i}^{n} Vm_i$$

is a total volume of an adhesive protruding beyond the bonding portion at the at least one bonding location in the negative direction, i is a number of bonding locations, $\alpha_{large}$ is a greater linear expansion coefficient between a linear expansion coefficient of the retainer and a linear expansion coefficient of the lens, $\alpha_{small}$ is a smaller linear expansion coefficient between the linear expansion coefficient of the retainer and the linear expansion coefficient of the lens, Va is a volume of the adhesive in the bonding portion between the retainer and the lens at the at least one bonding location, and Vb is a volume of the adhesive protruding beyond the bonding portion toward the lens at the at least one bonding location.

In another aspect of this disclosure, there is provided another improved scanning device including an illumination system to illuminate a document, the scanning lens described above to form a reduced image of light reflected from the document illuminated by the illumination system to form an image of the document, and an image sensor to optically convert the image of the document formed by the scanning lens into image data.

Further described are improved image forming apparatuses including the scanning device described above.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
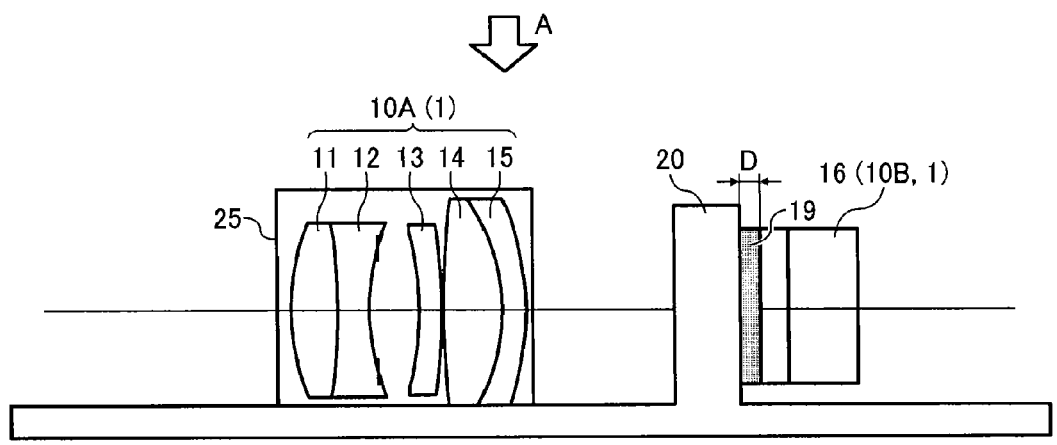
FIG. 1 is a schematic cross-sectional view of a scanning lens and a bonding location according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A detailed description is provided of configurations according to embodiments of FIG. 1 through FIG. 11 of the present disclosure.

(Scanning Lens)

First Embodiment

Figure 2:
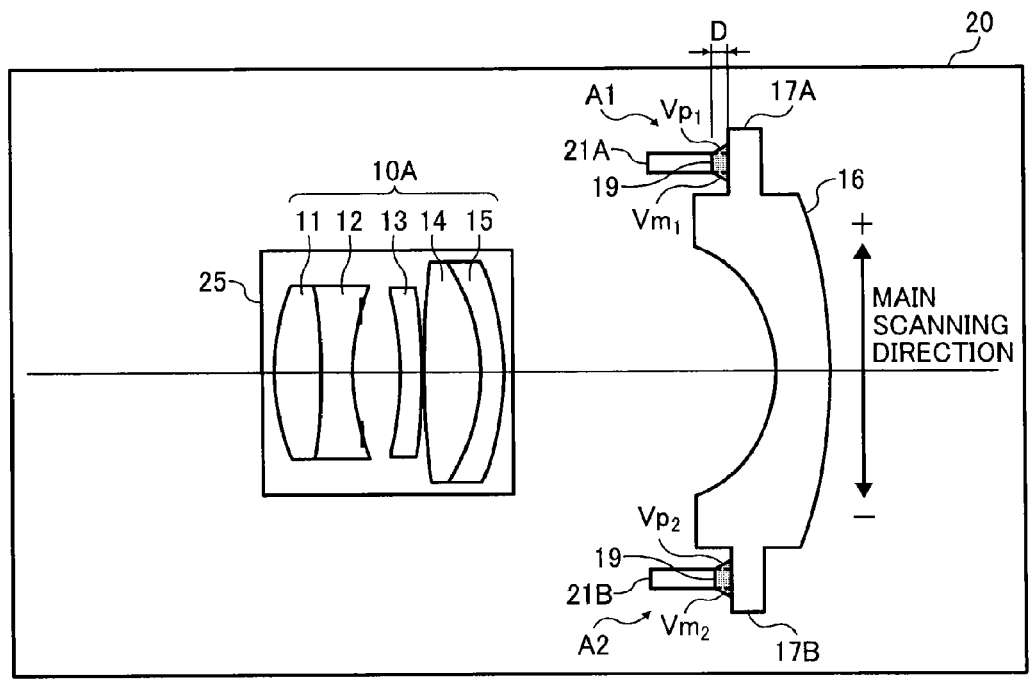
FIG. 2 is a view of the scanning lens viewed from the direction of the arrow in FIG. 2.

FIG. 1 and FIG. 2 illustrate a scanning lens 1 and a retainer 20 as a first embodiment of the present disclosure. FIG. 1 is a schematic cross-sectional view of the scanning lens 1 and bonding locations according to the first embodiment. FIG. 2 is a view of the scanning lens 1 viewed from the direction of the arrow A in FIG. 1.

In the present embodiment, the scanning lens 1 includes a front-group lens 10A disposed on the object side and a rear-group lens 10B disposed on the image side. The front-group lens 10A includes five lenses 11 through 15 including at least one positive lens and a negative lens. The rear-group lens 10B includes one plastic negative lens 16. Each of the lenses 11 through 15 in the front-group lens 10A is retained by a front-group retainer 25. The lens 16 of the rear-group lens 10B is retained by the retainer 20.

The lens 16 includes an attachment portion 17A and an attachment portion 17B at the positive side and the negative side, respectively in the longitudinal direction (a main scanning direction) of the lens 16. The attachment portions 17A and 17B allow the lens 16 to be fixed onto and retained by the retainer 20. Each of the attachment portions 17A and 17B constitute a bonding location A1 (A2), at which the lens 16 is bonded to the retainer 20. The retainer 20 includes an attachment portion 21A and an attachment portion 21B at the positive side and the negative side, respectively in the main scanning direction. The attachment portion 21A and the attachment portion 21B correspond to the attachment portion 17A and the attachment portion 17B, respectively. The attachment portion 17A and the attachment portion 17B are bonded to the attachment portion 21A and the attachment portion 21B, respectively with an adhesive 19, so that the retainer 20 retains the lens 16. Examples of the adhesive 19, which in the present embodiment is an ultraviolet cure adhesive, include UVX-8204 (registered trademark) manufactured by Denka Company Limited, WORLDROCK 5342 (registered trademark) and WORLDROCK XVL-90T2 (registered trademark) manufactured by Kyoritsu Chemical & Co., Ltd. It is to be noted that, a location, in which the attachment portion 17A is bonded to the attachment portion 21A by the adhesive 19, is a bonding location A1, and a location, in which the attachment portion 17B is bonded to the attachment portion 21B by the adhesive 19, is a bonding location A2.

The retainer 20 is a base of the scanning lens 1. The retainer 20 holds the front-group retainer 25 as well.

It is to be noted that the symbol "D" in the figures refers to the distance between the retainer 20 and the lens 16. The symbols "$Vp_1$" and "$Vp_2$" refer to the volumes of the adhesive 19 that protrude beyond bonding portions in the positive direction at the respective boding locations A1 and A2. The symbols "$Vm_1$" and "$Vm_2$" refer to the volumes of the adhesive 19 that protrude beyond the bonding portions in the negative direction at the respective bonding locations A1 and A2. In this case, the term "bonding portion" refers to a portion between the retainer 20 and the lens 16, which is hidden and invisible when the lens 16 is viewed from the retainer 20 side in the vertical direction. That is, the bonding portion is a portion except for an adhesive portion protruding beyond the hidden portion at the bonding location.

Second Embodiment

Figure 3:
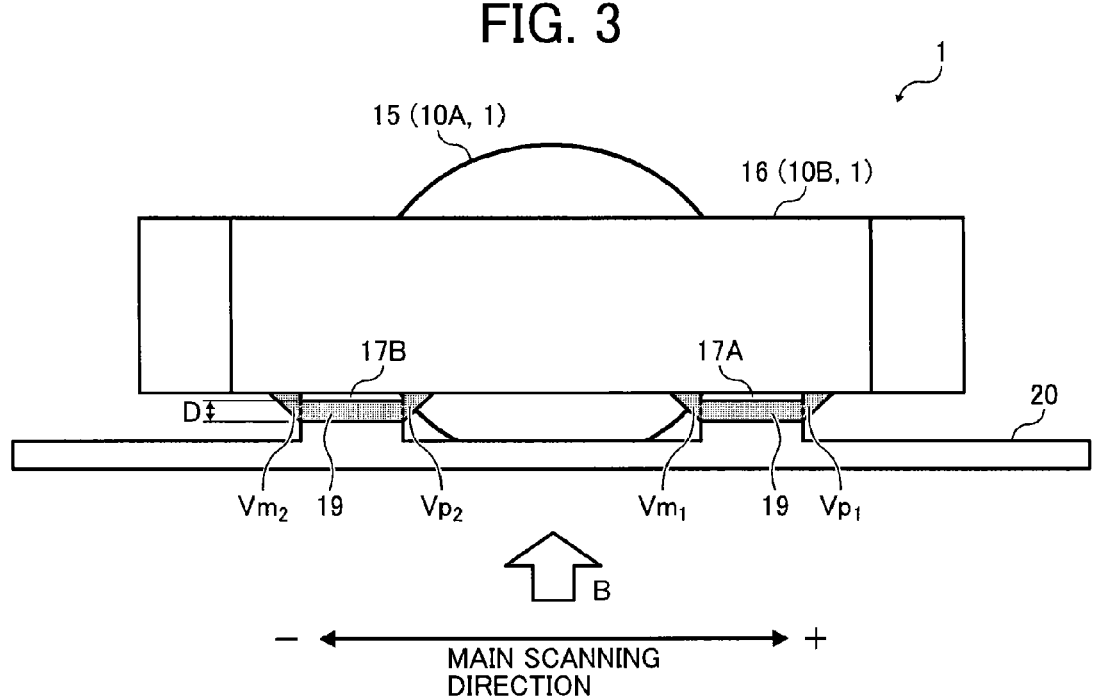
FIG. 3 is a schematic view of a scanning lens and a bonding location viewed from the side of an image sensor according to a second embodiment of the present disclosure.
Figure 4:
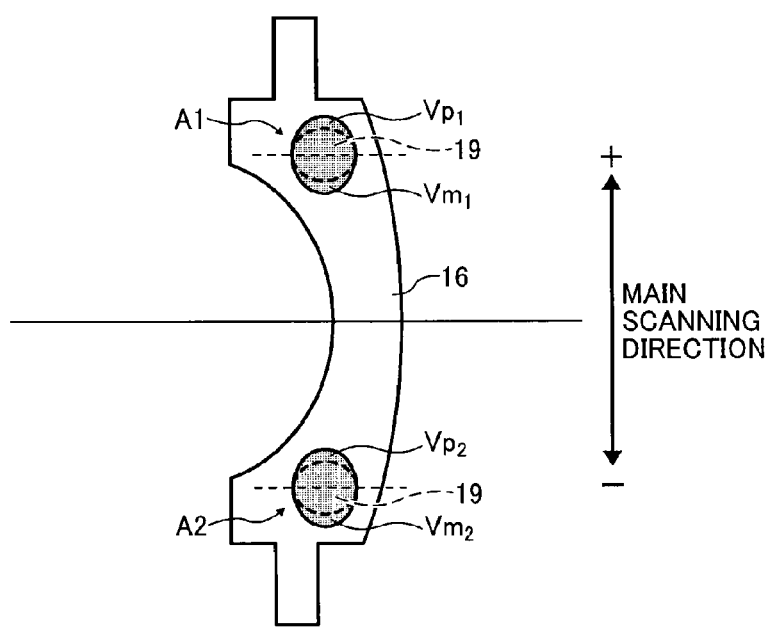
FIG. 4 is a view of a rear-group lens viewed from the direction of the arrow in FIG. 3.

FIG. 3 and FIG. 4 illustrate a scanning lens 1 and a retainer 20 according to a second embodiment of the present disclosure. FIG. 3 is a schematic view of the scanning lens 1 and bonding locations A1 and A2 viewed from the side of an image sensor according to the second embodiment. FIG. 4 is a view of a rear-group lens 10B viewed from the direction of the arrow B in FIG. 3. It is to be noted that a description is omitted of the same aspects as those of the above-described embodiment.

In the scanning lens 1 according to the second embodiment, the lens 16 of a rear-group lens 10B includes attachment portions 17A and 17B on the bottom side (on a retainer 20 side) of the lens 16. At the attachment portions 17A and 17B, the lens 16 is bonded to the retainer 20.

Third Embodiment

Figure 5:
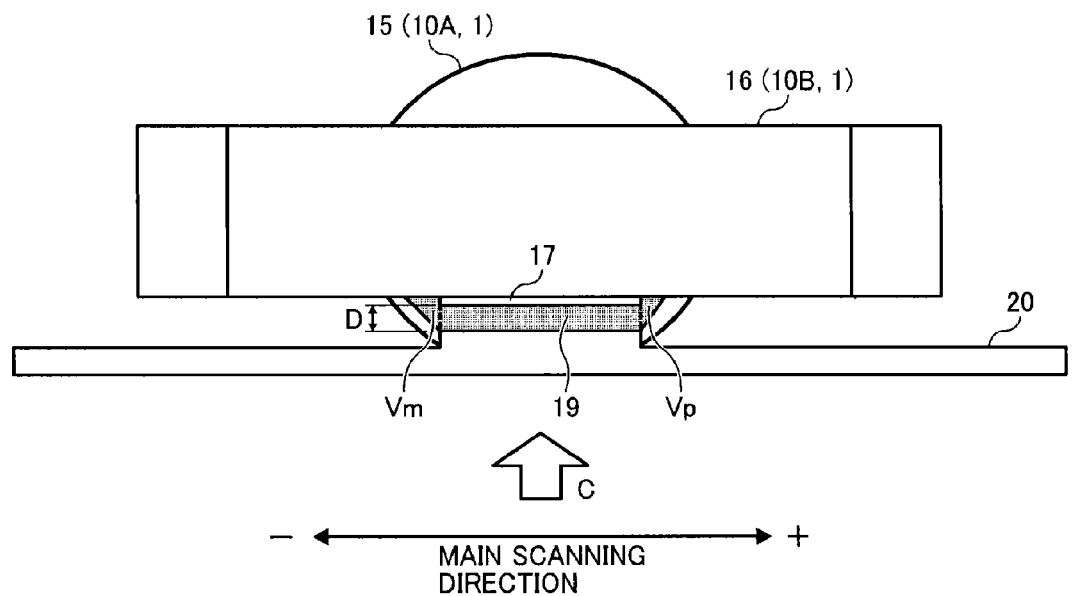
FIG. 5 is a schematic view of a scanning lens and a bonding location viewed from the side of an image sensor according to a third embodiment of the present disclosure.
Figure 6:
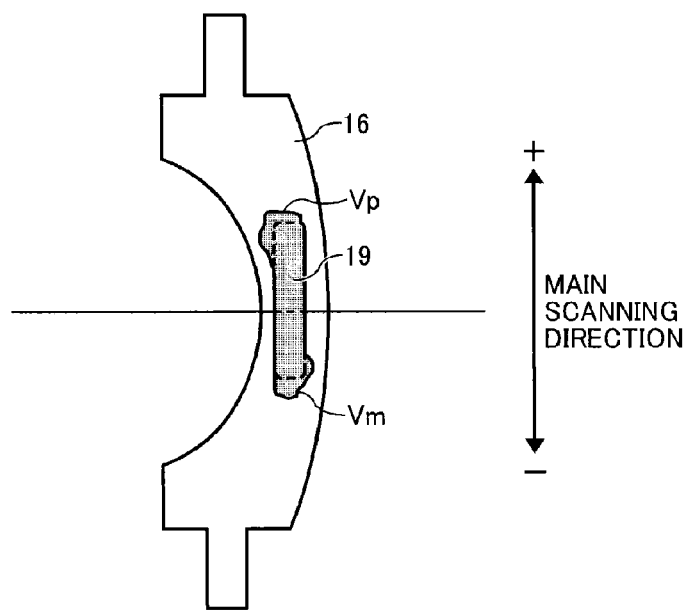
FIG. 6 is a view of a rear-group lens viewed from the direction of the arrow in FIG. 5.

FIG. 5 and FIG. 6 illustrate a scanning lens 1 and a retainer 20 according to a third embodiment of the present disclosure. FIG. 5 is a schematic view of the scanning lens 1 and a bonding location viewed from the side of an image sensor according to the third embodiment. FIG. 6 is a view of the rear-group lens 10B viewed from the direction of the arrow C in FIG. 5. It is to be noted that a description is omitted of the same aspects as those of the above-described embodiment.

In the scanning lens 1 according to the third embodiment, the lens 16 of the rear-group lens 10B includes attachment portions 17A and 17B on the bottom side (on the retainer 20 side) of the lens 16. At the attachment portions 17A and 17B, the lens 16 is bonded to the retainer 20.

It is to be noted that, the symbol "Vp" refers to the volume of an adhesive 19 protruding beyond a bonding portion at the bonding location in the positive direction, and the symbol "Vm" refers to the volume of the adhesive 19 protruding beyond a bonding portion at a bonding location in the negative direction.

Fourth Embodiment

Figure 7:
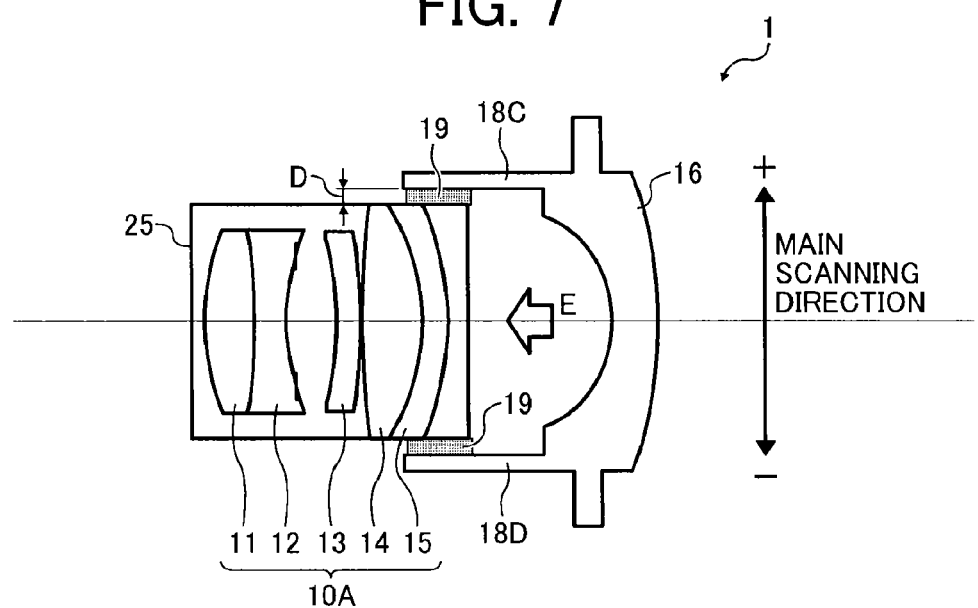
FIG. 7 is a schematic cross-sectional view of a scanning lens and a bonding location according to a fourth embodiment of the present disclosure.
Figure 8:
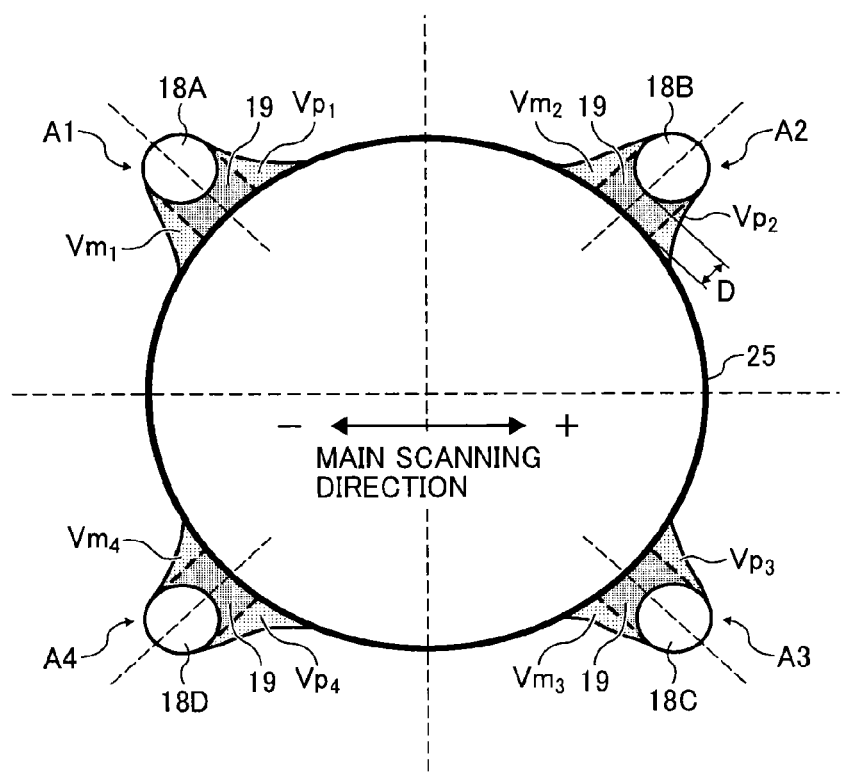
FIG. 8 is a view at a bonding location viewed from the direction of the arrow in FIG. 7.

FIG. 7 and FIG. 8 illustrate a scanning lens 1 and a retainer 25 according to a fourth embodiment of the present disclosure. FIG. 7 is a schematic cross-sectional view of the scanning lens 1 and a bonding location according to the fourth embodiment. FIG. 8 is a view of a front-group lens 10A viewed from the direction of the arrow E in FIG. 7.

The scanning lens 1 according to the fourth embodiment includes a lens 16 of a rear group 18B with four legs 18 (18A through 18D), each extending toward the object side (the front-group lens side), and further includes a front-group retainer 25 to retain the front group lens 10A. The legs 18A through 18D are bonded to the front-group retainer 25. A bonding location A1 is a location, in which the leg 18A and the front-group retainer 25 are bonded to each other by an adhesive 19. Similarly, bonding locations A2 through A4 are the respective locations, in which the legs 18B through 18D are bonded to the front-group retainer 25 by an adhesive 19.

It is to be noted that the symbols "$Vp_1$", "$Vp_2$", "$Vp_3$", and "$Vp_4$" refer to the volumes of an adhesive 19 protruding beyond bonding portions at the respective bonding locations A1 through A4 in the positive direction. The symbols "$Vm_1$", "$Vm_2$", "$Vm_3$", and "$Vm_4$" refer to the volumes of the adhesive 19 protruding beyond the bonding portions at the respective bonding locations A1 through A4 in the negative direction.

[Conditional Formula]

The scanning lens 1 according to the present embodiments, to scan a document image includes a retainer 20 and at least one lens (for example, the lens 16 of the rear-group lens 10B) bonded to the retainer 20. In the scanning lens 1 according to the present embodiment, no adhesive 19 protrudes beyond the bonding portion between the retainer 20 and the lens 16. Alternatively, in the scanning lens 1 according to the present embodiments, the ratio of the amount (volume) of the adhesive 19 only at the bonding portion at each bonding location A1, A2, A3, or A4 to the amount of the adhesive 19 protruding beyond the corresponding bonding portion is less than or equal to a predetermined value. In addition to this condition, the ratio of the linear expansion coefficient of the retainer 20 to the linear expansion coefficient of the lens 16 and the ratio of the amount of the adhesive 19 protruding beyond each bonding portion toward the main scanning direction satisfy a predetermined relation.

Preferably, the scanning lens 1 satisfies conditional formula (1) in mathematical expression 2 below. Alternatively, the scanning lens 1 preferably satisfies conditional formula (2) and conditional formula (3).

[Mathematical Expression 2]

$$Vb = 0, \quad (1)$$

$$0 \le \left| \alpha_{large} / \alpha_{small} \times \left( \sum_i^n Vp_i - \sum_i^n Vm_i \right) \middle/ \left( \sum_i^n Vp_i + \sum_i^n Vm_i \right) \right| < 3.5 \quad (i = 1, 2, \ldots n), \quad (2)$$

and $$0 < Vb/Va < 0.5 \quad (3)$$

where, $$\sum_i^n Vp_i$$

is the total volume or the adhesive protruding beyond a bonding portion at each bonding location in the positive direction of the main scanning direction encompassing the positive direction and the negative direction opposite to the positive direction, $$\sum_i^n Vm_i$$

is the total volume of the adhesive protruding beyond a bonding portion at each bonding location in the negative direction, i is the number of bonding locations, $\alpha_{large}$ is a greater linear expansion coefficient between the linear expansion coefficient of the retainer and the linear expansion coefficient of the lens, $\alpha_{small}$ is a smaller linear expansion coefficient between the linear expansion coefficient of the retainer and the linear expansion coefficient of the lens, Va is the volume of the adhesive in a bonding portion between the retainer and the lens at each bonding location, and Vb is the volume of the adhesive protruding beyond a bonding portion to the lens at each bonding location.

Such a configuration, as described in detail below, reduces a lens misalignment caused by the expansion and contraction of the adhesive 19 due to changes in temperature, thereby achieving a scanning lens that maintains successful image forming performance even with changes in temperature while reducing the number of man-hours involved for its construction.

Conditional formula (1) defines the adhesive 19 not protruding beyond the bonding portion.

Conditional formula (2) defines the relations between the ratio of the linear expansion coefficient of the retainer 20 retaining the scanning lens 1 to the linear expansion coefficient of the lens (hereinafter, referred to as lens 16) bonded to and retained by the retainer 20, and the ratio of the amount of the adhesive 19 protruding toward the main scanning direction beyond the bonding portion at each bonding location.

During changes in temperature, the lens 16 is subjected to a force from the bonding location due to the difference in the linear expansion coefficient between the lens 16 and the retainer 20. With a low ratio in linear expansion coefficient between the retainer 20 and the lens 16, the lens 16 is subjected to a small force from the retainer 20, by nature. With extremely poor balance of the amount of the adhesive 19 protruding toward the main scanning direction at the entire bonding locations, however, a force applied in a direction, to which a balance between the lens 16 and the retainer 20 is inclined due to changes in temperature, to vary the position and posture of the lens 16 increases under the influence of the protruding adhesive 19. As a result, the lens 16 moves more greatly during changes in temperature.

With a high ratio of linear expansion coefficient between the retainer 20 and the lens 16, even in the case of a little unbalanced ratio of the amount of the adhesive 19 protruding toward the main scanning direction at the entire bonding locations, an increased force is applied to the lens 16 due to the difference in linear expansion coefficient during changes in temperature as well as the poor balance between the lens 16 and the retainer 20. As a result, the posture of the lens 16 greatly varies. This variation in the posture of the lens 16 deteriorates the image forming performance even with changes in temperature.

Conditional formula (3) defines the ratio of the amount (volume) of the adhesive 19 at the bonding portion between the retainer 20 and the lens 16 at each bonding location A1, A2, A3, or A4 to the amount of the adhesive protruding beyond the bonding portion, in the scanning lens 1.

With an excessively high ratio of the volume of the adhesive 19 protruding toward the lens 16 beyond the bonding portion to the volume of the adhesive 19 at the bonding portion, the ratio of contribution to the fixation of the lens 16 at the bonding portion decreases while the ratio of contribution to the fixation of the lens 16 at the adhesive protruding beyond the bonding portion increases. For example, when the entire volume of the protruding adhesive 19 in the entire protruding locations is greater than or equal to half of the volume of the adhesive 19 at the entire bonding locations, the influence of the adhesive 19 protruding beyond the bonding portion becomes dominant, which means that bonding of the lens 16 to the retainer is not controlled by the adhesive 19 at the bonding portion.

The present inventor has found that satisfying conditional formulas (2) and (3) maintains a successful image forming performance even with changes in temperature. In addition, failing to satisfy conditional formulas (2) and (3) leads to a deterioration in the image forming performance with changes in temperature.

In the scanning lens 1 according to the present embodiment, satisfying conditional formula (1) achieves no amount of the adhesive 19 protruding beyond the bonding portion. Alternatively, setting the permissible amount of the adhesive 19 adhering to an unintended place within the range of conditional formula (3) reduces the influence of the adhesive 19 protruding beyond the bonding portion. In addition, Conditional formula (2) defines the ratio of the linear expansion coefficient of the retainer 20 and the linear expansion coefficient of the lens 16, and the balance ratio of the volume of the adhesive 19 protruding beyond the bonding portion at each bonding location.

With such a configuration, a scanning lens 1 with a high performance, maintaining a successful image forming performance is obtained, such that the lens 16 does not shift or tilt toward the main scanning direction, in which a deterioration in the image forming performance increases even with changes in temperature.

A description is provided of more favorable conditions of the scanning lens 1 below.

In the scanning lens 1, satisfying conditional formula (4) below further maintains a successful image forming performance:

$$0 \leq D < 1.0 \qquad (4)$$

where,

D denotes the distance (mm) between the retainer 20 and the lens 16 at the bonding portion.

Conditional formula (4) defines the distance between the retainer 20 and the lens 16 at the bonding portion at the bonding location A1, A2, A3, or A4. With the value of D exceeding the upper limit defined by conditional formula (4), the distance between the retainer 20 and the lens 16 excessively increases, thereby increasing a variation in the position and posture of the lens 16 with changes in temperature when the balance of the amount of the adhesive 19 collapses.

With changes in temperature, a force is applied to the lens 16 due to expansion and contraction. Further, with changes in temperature, the adhesive 19 between the retainer 20 and the lens 16 at the bonding location A1, A2, A3 or A4 bends toward a direction, in which the force is applied, while reacting against the force. The amount of variation in (bending of) the lens 16 increases with a thick adhesive 19 as compared to with a thin adhesive 19.

The same applies to the case, in which vibration force is applied. With an adhesive 19 having an increased thickness, variation in position and posture of the lens 16 more greatly increases.

Accordingly, satisfying conditional formula (4) reduces the variation in the lens 16, thereby maintaining a successful image forming performance.

In the scanning lens 1, satisfying conditional formula (5) below further maintains a successful image forming performance with changes in temperature:

$$0 \leq D(D\text{max} - D\text{min})/D\text{max} < 0.5 \qquad (5),$$

where,

Dmax denotes a maximum distance between the retainer 20 and the lens 16 at a bonding portion at a bonding location, and Dmin denotes a minimum distance between the retainer 20 and the lens 16 at a bonding portion at a bonding location.

Conditional formula (5) defines the distance between the retainer 20 and the lens 16 at a bonding portion at a bonding location A1, A2, A3, or A4. With the value of (Dmax−Dmin)/Dmax exceeding the upper limit defined by conditional formula (5), the thickness of the adhesive 19 differs depending on a bonding portion at each bonding location, and thereby the relation in force of expansion and contraction between the lens 16 and the adhesive 19 according to changes in temperature varies depending on a position of a bonding portion, so that the posture of the lens 16 varies with changes in temperature. As a result, obtaining a successful image forming performance is difficult.

Satisfying at least one of conditional formula (4) and conditional formula (5) more properly eliminates or reduces a lens misalignment due to expansion and contraction caused by changes in temperature, thereby achieving the scanning lens 1 with a high performance that maintains a successful image forming performance even even with changes in temperature.

The scanning lens 1 according to the present embodiment preferably includes the front-group lens 10A with a positive lens and three to five negative lenses, and the rear-group lens 10B with a plastic negative lens. With such a configuration, a compact scanning lens with aberrations properly corrected is achieved.

Further, in the scanning lens 1, it is preferable for the rear-group lens 10B to be bonded to the retainer 20. A bonding location is easily formed on the rear-group lens 10B because the rear-group lens 10B is plastic. This facilitates bonding the rear-group lens 10B (the lens 16) to the retainer 20, thereby reducing the number of man-hours involved for its construction. Further, applying bonding to the end of the lens system his facilitates bonding, thereby reducing the number of man-hours involved for its construction.

Further, in the scanning lens 1, it is preferable for the rear-group lens 10B to have at least one aspherical surface. Having the rear-group lens 10B with at least one aspherical surface properly corrects distortion.

Further, in the scanning lens 1, it is preferable for the front-group lens 10A to have at least one aspherical surface. Having the front-group lens 10A with at least one aspherical surface properly corrects aberrations.

In the scanning lens 1, the rear-group lens 10B may not have the outer shape of rotational symmetry with respect to the optical axis because a light receiving element array (image sensor) is disposed on the image surface. The rear-group lens 10B may be of an elongated strip shape along the main scanning direction.

With such a configuration with the light receiving element array, instead of increasing the diameter of lens of the rear-group lens 10B to obtain quality with a high performance, a width for a light ray to pass through may be provided in only one direction, i.e., the main scanning direction that is the arrangement direction of the light receiving elements. Accordingly, the length (which corresponds to the height of the scanning lens 1) of the scanning lens 1 in a direction perpendicular to the arrangement direction of the light receiving element is reduced, thereby achieving a reduction in size of the scanning lens 1. This further achieves a reduction in weight and cost. Alternatively, the rear-group lens 10B may have the outer shape of rotational symmetry with respect to the optical axis. In this case, a configuration with an area sensor to simultaneously scan the whole viewing surface of an image is available.

According to the scanning lens 1 according to the present embodiment described above, adopting the method of bonding described above reduces a lens misalignment due to expansion and contraction caused by changes in temperature, thereby achieving an scanning lens 1 that maintains a successful image forming performance even with changes in temperature, reducing the number of man-hours involved for its construction.

(Scanning Device 1)

Figure 9:
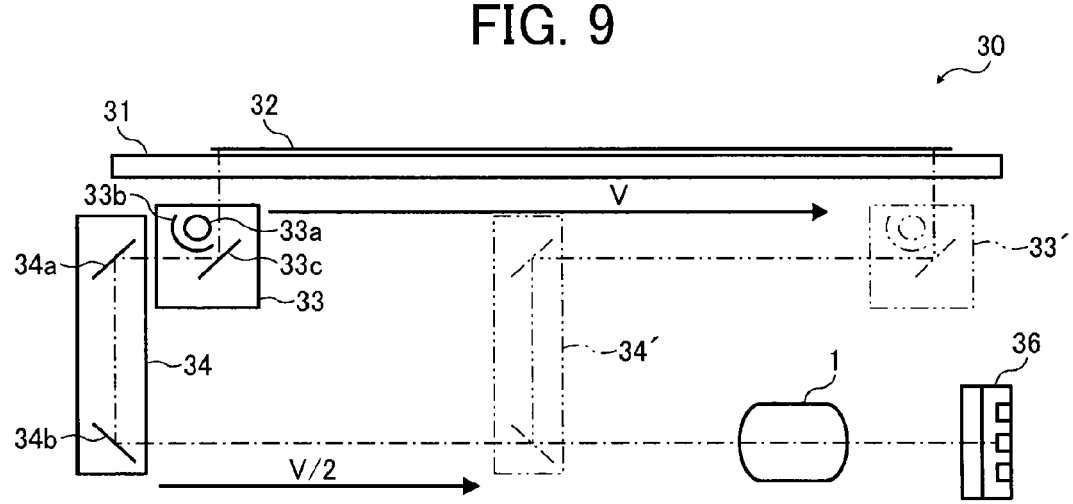
FIG. 9 is a schematic cross-sectional view of a scanning device as one example according to an embodiment of the present disclosure.

Next, a description is provided of a scanning device. FIG. 9 is a schematic cross-sectional view of a scanning device according to an embodiment of the present disclosure.

In a scanning device 30, a document 32 with a document image to be scanned is placed on the top surface of a document placing glass 31 in a planar manner. A first moving body 33 holds a mirror 33c with a mirror surface tilted by 45 degree with respect to a document placing surface of the document placing glass 31. The first moving body 33 moves from a position of the first moving body 33 depicted by a solid line to a position of another first moving body 33' depicted by a dotted line at a constant speed V along a longitudinal direction, which is a direction perpendicular to the drawing, as illustrated in FIG. 9. Another first moving body 33' is a first moving body having moved.

The first moving body 33 holds an illumination system, such as fluorescent lamp 33a and a reflector 33b elongating along the direction perpendicular to the drawing. The fluorescent lamp 33a emits light to illuminate the document 32 on the document placing glass 31 when the first moving body 33 starts to move to right in FIG. 9. Accordingly, during the movement of the first moving body 33 to the position (of the first moving body 33') indicated by the dotted line, the document 32 is optically scanned.

Examples of the fluorescent lamp 33a include a tube lamp, such as a halogen lamp, a xenon lamp, and a cold cathode tube, a light emitting diode (LED), in which point light sources are arranged in a row, a linear light source with a light guide body to convert a point light source into a linear light source, and a surface emitting light source, such as an organic electroluminescence (EL).

A second moving body 34 elongates along the direction perpendicular to the drawing. The second moving body 34 holds a pair of mirror 34a and 34b with mirror surfaces respectively tilted to form an angle of 90°. The second moving body 34 moves from a position of the second moving body 34 depicted by a solid line to a position of another second moving body 34' depicted by a dotted line at a constant speed V/2, in synchronization with movement of the first moving body 33. Another second moving body 34' is a second moving body having moved.

When the document 32 is optically scanned, the reflected light from an illuminated area of the document 32 is reflected by the mirror 33c of the moving body 33, and is sequentially reflected by the mirror 34a and the mirror 34b to enter the scanning lens 1 (image forming lens) as image-forming light rays.

In this case, the ratio of the speed of the first moving body 33 to the speed of the second moving body 34 is 2:1. Accordingly, the optical path length from the illuminated area of the document 32 to the scanning lens 1 is maintained constant.

The image forming light rays having entered the scanning lens 1 is subjected to the image forming operation of the scanning lens 1, thereby forming a reduced image of the document 32 on the light receiving surface of an image sensor 36. The image sensor 36 is a CCD line sensor, in which micro-photoelectric conversion parts are closely arranged in the direction perpendicular to the drawing. With the optical scanning over the document 32, the image sensor 36 outputs an electric signal for a pixel unit regarding a document image. The output electric signal is subjected to signal processing, such as an analog-to-digital (A/D) conversion, converted to an image signal, and stored in a memory as needed.

It is to be noted that the image sensor 36 separates the image forming image into three colors, red, green, and blue, to scan color data, and synthesizes the electric signals converted by the respective photoelectric conversion parts to scan a color document.

In the scanning lens 1 of the scanning device 30 according to the present embodiment with the scanning lens 1 according to the present embodiments, adopting the method of bonding according to the present embodiment reduces a lens misalignment due to expansion and contraction caused by changes in temperature, thereby achieving an scanning device 30 including an scanning lens 1 with a high performance to maintain a successful image forming performance even with changes in temperature, reducing the number of man-hours involved for its construction. Such a configuration, as described below, reduces a lens misalignment caused by the expansion and contraction of the adhesive 19 due to changes in temperature, thereby achieving a scanning lens that maintains a successful image forming performance even with changes in temperature, reducing the number of man-hours involved for its construction.

(Scanning Device 2)

Figure 10:
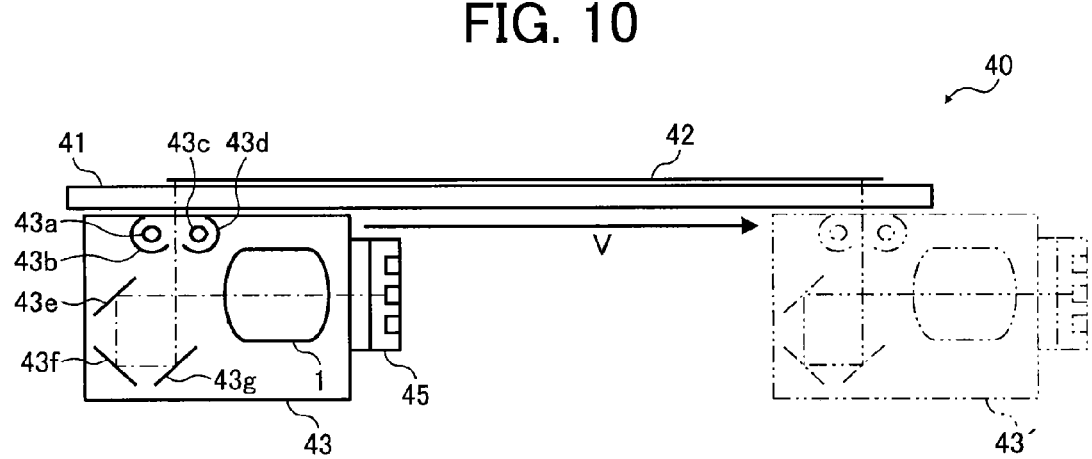
FIG. 10 is a schematic cross-sectional view of a scanning device as another example according to another embodiment of the present disclosure.

FIG. 10 illustrates a scanning device according to another embodiment. FIG. 10 is a schematic cross-sectional view of the scanning device 40.

In the scanning device 40, a document 42 with a document image to be scanned is placed on the top surface of a document placing glass 41 in a planar manner. A scanning unit 43 holds mirrors 43e, 43f, and 43g with mirror surfaces respectively tilted to a document placing surface of the document placing glass 41. The scanning unit 43 moves from a position of the scanning unit 43 depicted by a solid line to a position of another scanning unit 43 depicted by a dotted line at a constant speed V along a longitudinal direction, which is a direction perpendicular to the drawing, as illustrated in FIG. 10. Another scanning unit 43 is a scanning unit 43' having moved.

The scanning unit 43 holds an illumination system, such as fluorescent lamps 43a and 43c and reflectors 43b and 43d elongating along the direction perpendicular to the drawing. The fluorescent lamps 43a and 43c emit light to illuminate the document 42 on the document placing glass 41 when the scanning unit 43 moves to right in FIG. 10. Accordingly, during the movement of the scanning unit 43 to the position of the scanning unit 43' indicated by the dotted line, the document 42 is optically scanned.

When the document 42 is optically scanned, the reflected light from an illuminated area of the document 42 is sequentially reflected by the mirror 43e, the mirror 43f, and the mirror 43g to enter the scanning lens 1 (image forming lens) as image-forming light rays. In this case, all of the mirrors 43e, 43f, and 43g are held by the scanning unit 43 in an integral manner. Accordingly, the optical path length from the illuminated area of the document 42 to the scanning lens 1 is maintained constant.

The image forming light rays having entered the scanning lens 1 is subjected to the image forming operation of the scanning lens 1, thereby forming a reduced image of the document 42 on the light receiving surface of an image sensor 45. Then, same as in the scanning device 30 of FIG. 9, the formed reduced image is converted into electric signals to scan document data.

In the scanning lens 1 of the scanning device 40 according to the present embodiment with the scanning lens 1 according to the present embodiments, adopting the method of bonding according to the present embodiment reduce a lens misalignment due to expansion and contraction caused by changes in temperature, thereby achieving an scanning device 40 including an scanning lens 1 with a high performance to maintain a successful image forming performance even with changes in temperature, reducing the number of man-hours involved for its construction. Such a configuration reduces a lens misalignment caused by expansion and contraction of the adhesive 19 due to changes in temperature, thereby achieving an scanning device 40 reduced in size, weight, and cost, having a high performance to maintain a successful image forming performance even with changes in temperature.

(Image Forming Apparatus)

Figure 11:
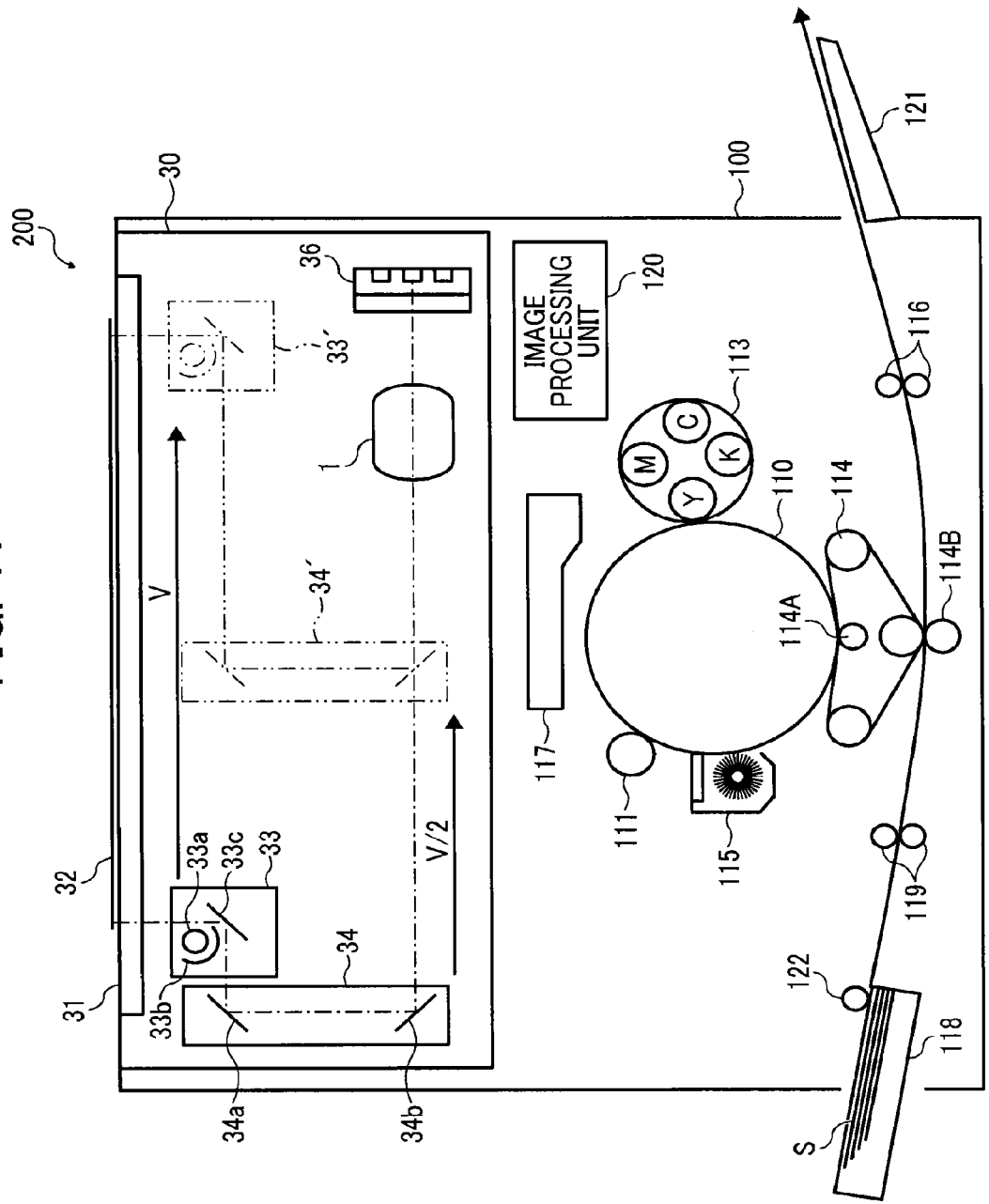
FIG. 11 is a schematic cross-sectional view of an image forming apparatus as one example according to an embodiment of the present disclosure.

Next, a description is provided of an image forming device. FIG. 11 is a schematic cross-sectional view of an image forming apparatus 200.

The image forming apparatus 200 includes a scanning device 30 in the upper part of the image forming apparatus 200 and an image forming unit 100 below the scanning device 30. In this case, a description is provided of a configuration with the scanning device 30 of FIG. 9 as a scanning device.

In the scanning device 30, the image sensor 36 as the CCD line sensor of three lines outputs an image signal to an image processing unit 120 to convert the image signal into a writing signal for writing each color of yellow, magenta, cyan, and black.

The image forming unit 100 includes a round photoconductor 110 having photoconductivity as a latent image bearer, a charging roller 111 as a charger, a revolver developing device 113, a transfer belt 114, and a cleaning device 115 around the photoconductor 110. As the charger, instead of the charging roller 111, a corona charger may be employed.

In response to the writing signal from the image processing unit 120, an optical scanner 117 optically scans the photoconductor 110 to write the colors. The optical scanning device 117 optically scans between the charging roller 111 and the developing device 113 on the photoconductor 110.

To form an image, the photoconductor 110 having photoconductivity rotates in a clockwise direction at a constant speed, and the charging roller 111 uniformly charges the surface of the photoconductor 110. The charged surface is exposed to an optical writing of a laser beam from the optical scanner 117 to form an electrostatic latent image on the surface of the photoconductor 110. The formed electrostatic latent image is a negative latent image with an image portion exposed to light.

To write an image, with rotation of the photoconductor 110, a yellow image, a magenta image, a cyan image, and a black image are written in this recited order. The formed electrostatic latent image is reversely developed by a developing unit Y with a yellow toner, a developing unit M with a magenta toner, a developing unit C with a cyan toner, and a developing unit K with a black toner in sequence to form a visualized positive image. The resultant toner images of the respective colors are sequentially transferred onto the transfer belt 114 by a transfer voltage application roller 114A such that the toner images of the respective colors are superimposed one atop the other, thereby forming a color image.

A cassette 118 storing a transfer sheet S as a recording medium is detachably installable to the apparatus body. With the cassette 118 installed, a sheet on the top of the stack of the transfer sheet S stored is fed by a feed roller 122, and the leading end of the transfer sheet S is captured by a registration roller pair 119.

The registration roller pair 119 sends the transfer sheet S to a transfer nip when the color image of toner on the transfer belt 114 starts to move to a position of transfer. Then, the color image is superimposed onto the transfer sheet S sent to the transfer nip, thus electrostatically transferring the color image onto the transfer sheet S at the transfer nip by a transfer roller 114B. The transfer roller 114B presses the transfer sheet S toward the color image on the transfer belt 114 during transfer.

The transfer sheet S having the color image transferred is sent to a fixing device 116. After fixing the color image onto the transfer sheet S in the fixing device 116, the transfer sheet S passes through a conveyance path to be discharged onto an output tray 121 by an output roller pair. With every transfer of each toner image, the surface of the photoconductor 110 is cleaned by the cleaning device 115, thereby removing the remaining toner and powder from the surface of the photoconductor 110.

Applying the scanning lens 1 described above to the scanning device 30 of the image forming apparatus 200 according to the present embodiment reduces a lens misalignment due to expansion and contraction of the adhesive 19 caused by changes in temperature, thereby achieving an image forming apparatus 200 including a scanning device 30 reduced in size, weight, and cost, with a high performance to maintain a successful image forming performance even with changes in temperature.

It is to be noted that, although a multicolor image forming apparatus is taken as an example of the image forming apparatus 200, a monochrome image forming apparatus is also applicable.

In the image forming apparatus 200 including a sheet discharge space between the scanning device 30 and the image forming unit 100 inside a housing of the image forming apparatus 200, employing the scanning device 30 with the scanning lens 1 described above reduces the height of the scanning device 30, increasing the space between the scanning device 30 and the image forming unit 100, to increase the visibility of the output transfer sheet S for an operator, facilitating the operation.

Although the embodiments of the present disclosure have been described above, the present disclosure is not limited to the embodiments described above, and a variety of modifications can naturally be made within the scope of the present disclosure.

For example, a round lens is employed in the embodiments described above. However, an oval lens with top and bottom are portions cut out may be used for the scanning lens 1.

EXAMPLES

A description is provided of Examples of the scanning lens 1 below.

Example 1

As Example 1, Table 1 represents parameters and calculated results of the scanning lens 1 according to a first embodiment as illustrated in FIGS. 1 and 2. It is to be noted that "mm" is used as the unit of distance, and "mm$^3$" is used as the unit of volume.

TABLE 1

|  | A1 | A2 |
|---|---|---|
| Va | 6 | 5.5 |
| Va/2 | 3 | 2.75 |
| Vb | 1 | 1.5 |
| D | 0.5 | 0.4 |

|  | TOTAL | |
|---|---|---|
| $Vp_1$ | 0.4 | 0.8 |
| $Vp_2$ | 0.4 | |
| $Vm_1$ | 0.6 | 1.7 |
| $Vm_2$ | 1.1 | |

TABLE 1-continued

|  | LENS | RETAINER |
|---|---|---|
| α | 6.0E−05 | 1.2E−05 |
| $\left\| \alpha_{large}/\alpha_{small} \times \left( \sum_{i}^{n} Vp_i - \sum_{i}^{n} Vm_i \right) / \left( \sum_{i}^{n} Vp_i + \sum_{i}^{n} Vm_i \right) \right\|$ (i = 1, 2, ... n) | | 1.8 |
| (Dmax − Dmin)/Dmax | | 0.2 |

Example 2

As Example 2, Table 2 represents parameters and calculated results of the scanning lens 1 according to a second embodiment as illustrated in FIGS. 3 and 4.

TABLE 2

|  | A1 | A2 |
|---|---|---|
| Va | 12 | 12 |
| Va/2 | 6 | 6 |
| Vb | 3 | 3 |
| D | 0.8 | 0.7 |

|  | TOTAL | |
|---|---|---|
| $Vp_1$ | 1.5 | 4 |
| $Vp_2$ | 2.5 | |
| $Vm_1$ | 1.5 | 2 |
| $Vm_2$ | 0.5 | |

|  | LENS | RETAINER |
|---|---|---|
| α | 8.0E−06 | 6.0E−05 |
| $\left\| \alpha_{large}/\alpha_{small} \times \left( \sum_{i}^{n} Vp_i - \sum_{i}^{n} Vm_i \right) / \left( \sum_{i}^{n} Vp_i + \sum_{i}^{n} Vm_i \right) \right\|$ (i = 1, 2, ... n) | | 2.5 |
| (Dmax − Dmin)/Dmax | | 0.13 |

Example 3

As Example 3, Table 3 represents parameters and calculated results of the scanning lens 1 according to a third embodiment as illustrated in FIGS. 5 and 6.

TABLE 3

| Va | 14 |
|---|---|
| Va/2 | 7 |
| Vb | 4 |
| D | 0.8 |
| Vp | 1.5 |
| Vm | 2.5 |

|  | LENS | RETAINER |
|---|---|---|
| α | 6.0E−05 | 1.9E−05 |
| $\left\| \alpha_{large}/\alpha_{small} \times \left( \sum_{i}^{n} Vp_i - \sum_{i}^{n} Vm_i \right) / \left( \sum_{i}^{n} Vp_i + \sum_{i}^{n} Vm_i \right) \right\|$ (i = 1, 2, ... n) | | 0.79 |
| (Dmax − Dmin)/Dmax | | 0 |

Example 4

As Example 4, Table 4 represents parameters and calculated results of the scanning lens 1 according to a fourth embodiment as illustrated in FIGS. 7 and 8.

TABLE 4

| | A1 | A2 | A3 | A4 |
|---|---|---|---|---|
| Va | 8 | 10 | 9 | 9 |
| Va/2 | 4 | 5 | 4.5 | 4.5 |
| Vb | 3 | 1 | 2 | 2 |
| D | 0.3 | 0.5 | 0.4 | 0.4 |

| | TOTAL | |
|---|---|---|
| $Vp_1$ | 1.2 | 3.6 |
| $Vp_2$ | 0.6 | |
| $Vp_3$ | 0.7 | |
| $Vp_4$ | 1.1 | |
| $Vm_1$ | 1.8 | 4.4 |
| $Vm_2$ | 0.4 | |
| $Vm_3$ | 1.3 | |
| $Vm_4$ | 0.9 | |

| | LENS | RETAINER |
|---|---|---|
| α | 7.0E−06 | 2.3E−05 |

$$\left| \alpha_{large}/\alpha_{small} \times \left( \sum_i^n Vp_i - \sum_i^n Vm_i \right) \Big/ \left( \sum_i^n Vp_i + \sum_i^n Vm_i \right) \right| \quad 0.33$$

(i = 1, 2, ... n)

(Dmax − Dmin)/Dmax     0.4

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A scanning lens to scan a document image, comprising:
   a lens; and
   a retainer to retain the lens bonded and fixed to the retainer by an adhesive,
   wherein:

$$0 \le \left| \alpha_{large}/\alpha_{small} \times \left( \sum_i^n Vp_i - \sum_i^n Vm_i \right) \Big/ \left( \sum_i^n Vp_i + \sum_i^n Vm_i \right) \right| < 3.5 \; (i = 1, 2, \ldots n)$$

and $$0 < Vb/Va < 0.5$$

and $$0 < Vb/Va < 0.5$$

Where $$\sum_i^n Vp_i$$

is a total volume of an adhesive protruding in a positive direction of a main scanning direction beyond a bonding portion between the retainer and the lens at at least one bonding location, at which the lens is bonded to the retainer by the adhesive, the main scanning direction including the positive direction and a negative direction opposite to the positive direction, $$\sum_i^n Vm_i$$

is a total volume of an adhesive protruding beyond the bonding portion at the at least one bonding location in the negative direction,
i is a number of bonding locations,
$\alpha_{large}$ is a greater linear expansion coefficient between a linear expansion coefficient of the retainer and a linear expansion coefficient of the lens,
$\alpha_{small}$ is a smaller linear expansion coefficient between the linear expansion coefficient of the retainer and the linear expansion coefficient of the lens,
Va is a volume of the adhesive in the bonding portion between the retainer and the lens at the at least one bonding location, and
Vb is a volume of the adhesive protruding beyond the bonding portion toward the lens at the at least one bonding location.

2. The scanning lens according to claim 1, wherein $$0 \le D < 1.0,$$

where D is a distance between the retainer and the lens in the bonding portion at the at least one bonding location.

3. The scanning lens according to claim 1, wherein $$0 \le D(D\text{max}-D\text{min})/D\text{max} < 0.5$$

where Dmax is a maximum distance between the retainer and the lens in the bonding portion at the at least one bonding location, and Dmin is a minimum distance between the retainer and the lens in the bonding portion at the at least one bonding location.

4. The scanning lens according to claim 1, further comprising:
   a front-group lens disposed on an object side, including one or more positive lenses and three to five negative lenses; and
   a rear-group lens disposed on an image side and including a plastic negative lens.

5. The scanning lens according to claim 4, wherein the lens bonded to the retainer is the rear-group lens.

6. The scanning lens according to claim 4, wherein at least one of the front-group lens and the rear-group lens includes a lens having at least one aspherical surface.

7. The scanning lens according to claim 4, wherein the rear-group lens has an outer shape of rotational asymmetry with respect to an optical axis.

8. The scanning lens according to claim 7, wherein the rear-group lens has an outer shape of an elongated strip along the main scanning direction.

9. A scanning device comprising:
an illumination system to illuminate a document;
the scanning lens according to claim 1 to form a reduced image of light reflected from the document illuminated by the illumination system to form an image of the document; and
an image sensor to optically convert the image of the document formed by the scanning lens into image data.

10. An image forming apparatus comprising the scanning device according to claim 9.

* * * * *